United States Patent [19]
Cho

[11] Patent Number: 6,115,844
[45] Date of Patent: Sep. 12, 2000

[54] AUXILIARY SWEATBAND FOR HEADGEAR

[75] Inventor: Byoung-Woo Cho, Seoul, Rep. of Korea

[73] Assignee: Yupoong & Co., Ltd., Seoul, Rep. of Korea

[21] Appl. No.: 09/415,702

[22] Filed: Oct. 11, 1999

[51] Int. Cl.⁷ .................................................... A42B 1/22
[52] U.S. Cl. ................................................. 2/181; 2/175.1
[58] Field of Search .......................... 2/181, 181.2, 184, 2/182.2, 171, 175.1, DIG. 11

[56] References Cited

U.S. PATENT DOCUMENTS

| | | | |
|---|---|---|---|
| 3,309,713 | 3/1967 | Kaufman | 2/183 |
| 3,337,877 | 8/1967 | Lipkin | 2/172 |
| 4,815,144 | 3/1989 | Martin | 2/7 |
| 5,033,122 | 7/1991 | Smith | 2/209.3 |
| 5,566,395 | 10/1996 | Nebeker | 2/181 |
| 5,715,540 | 2/1998 | Cho | 2/195.3 |

*Primary Examiner*—Bibhu Mohanty
*Attorney, Agent, or Firm*—Armstrong, Westerman, Hattori, McLeland & Naughton

[57] ABSTRACT

An auxiliary sweatband for headgear is disclosed. The auxiliary sweatband for headgear has a plurality of laminated normal non-woven fabric strips. A non-woven fabric strip is coated with a hydrophobic resin and is laminated at the back of the normal non-woven fabric strips. An unabsorbent non-woven fabric strip is laminated at the back of the non-woven fabric strip coated with a hydrophobic resin. A nylon woven fabric strip is coated with a polyurethane resin and is sewn with sewing threads on the laminated strips to surround the laminated strips except a front middle portion of the laminated strips. The laminated non-woven strips are bonded together. The overlapped strips are cut to be a little longer than the length of the inner edge of the visor of the cap and to have diagonal surfaces of 45° at their ends.

1 Claim, 5 Drawing Sheets

AUXILIARY SWEATBAND FOR HEADGEAR

BACKGROUND OF THE INVENTION

1. Field of the Invention

The present invention relates, in general, to sweatbands for headgear and, more particularly, to an auxiliary sweatband for headgear, causing the wearer to feel comfortable and preventing the sweat from contaminating the crown of a cap by absorbing the sweat and discharging it.

2. Description of the Prior Art

Free-size caps are disclosed in Korea patent No. 82922 and U.S. Pat. No. 5,715,540. Each of the free-size caps is provided with a sweatband, the sweatband being made of elastic textile fabric. However, since the sweatband has a simple construction, the sweat absorbed in the sweatband soaks into the crown of the cap, thereby causing the crown to be deformed and to be contaminated. In more detail, water accounting for 90% of the sweat is directly evaporated, but urea, uric acid, fatty acid, etc. of the sweat are vaporized after reacting with the dye contained in the fabric of the crown of a cap. Therefore, the urea, uric acid, fatty acid, etc. make stains on the crown, thus deforming and contaminating the crown.

Another conventional sweatband is known from Korea patent application No. 98-20461. As shown in FIGS. 5 and 5a, a sweatband for headgear comprises five laminated absorbent non-woven fabric strips 21–25, four laminated absorbent non-woven fabric strips 27–29, a first unabsorbent non-woven fabric strip 26 interposed between the laminated absorbent non-woven fabric strips 25 and 27, and a second unabsorbent non-woven fabric strip 30 positioned at the back of the laminated absorbent non-woven fabric strip 29. However, this sweatband also has disadvantages. That is, since the external absorbent layers of the sweatband consist of a small number of strips, they are not sufficient to absorb a large amount of sweat quickly, so that a degree of the sweat flows down along a wearer's face, thereby causing the wearer to feel unpleasant. In a summer season and when the wearer is practicing a sport, the problem becomes significant. Additionally, since the internal absorbent layers 27–29 absorb sweat and are interposed between unabsorbent non-woven fabric strips 26 and 30, the absorbed sweat in the layers 27–29 is not easily evaporated, thereby causing the wearer to feel unpleasant.

SUMMARY OF THE INVENTION

Accordingly, the present invention has been made keeping in mind the above problems occurring in the prior art, and an object of the present invention is to provide an auxiliary sweatband for headgear, causing the wearer to feel comfortable and preventing the sweat from contaminating the crown of a cap by absorbing the sweat and discharging it.

In order to accomplish the above object, the present invention provides an auxiliary sweatband for headgear, comprising a plurality of laminated normal non-woven fabric strips, a non-woven fabric strip coated with a hydrophobic resin and laminated at the back of the normal non-woven fabric strips, an unabsorbent non-woven fabric strip laminated at the back of the non-woven fabric strip coated with a hydrophobic resin, and a nylon woven fabric strip coated with a polyurethane resin and sewn with sewing threads on the laminated strips to surround the laminated strips except a front middle portion of the laminated strips, and wherein the laminated non-woven strips are bonded together and the overlapped strips are cut to be a little longer than the length of the inner edge of the visor of the cap and to have diagonal surfaces of 45° at their ends.

BRIEF DESCRIPTION OF THE DRAWINGS

The above and other objects, features and other advantages of the present invention will be more clearly understood from the following detailed description taken in conjunction with the accompanying drawings, in which:

FIG. 4a is an enlarged view of a portion of the sweatband od FIG. 4 indicated by the circle labeled FIG. 4a;

FIG. 5a is an enlarged view of a portion of the sweatband of FIG. 5 indicated by the cirlcle labeled FIG. 5a.

DESCRIPTION OF THE PREFERRED EMBODIMENTS

Figure 1:
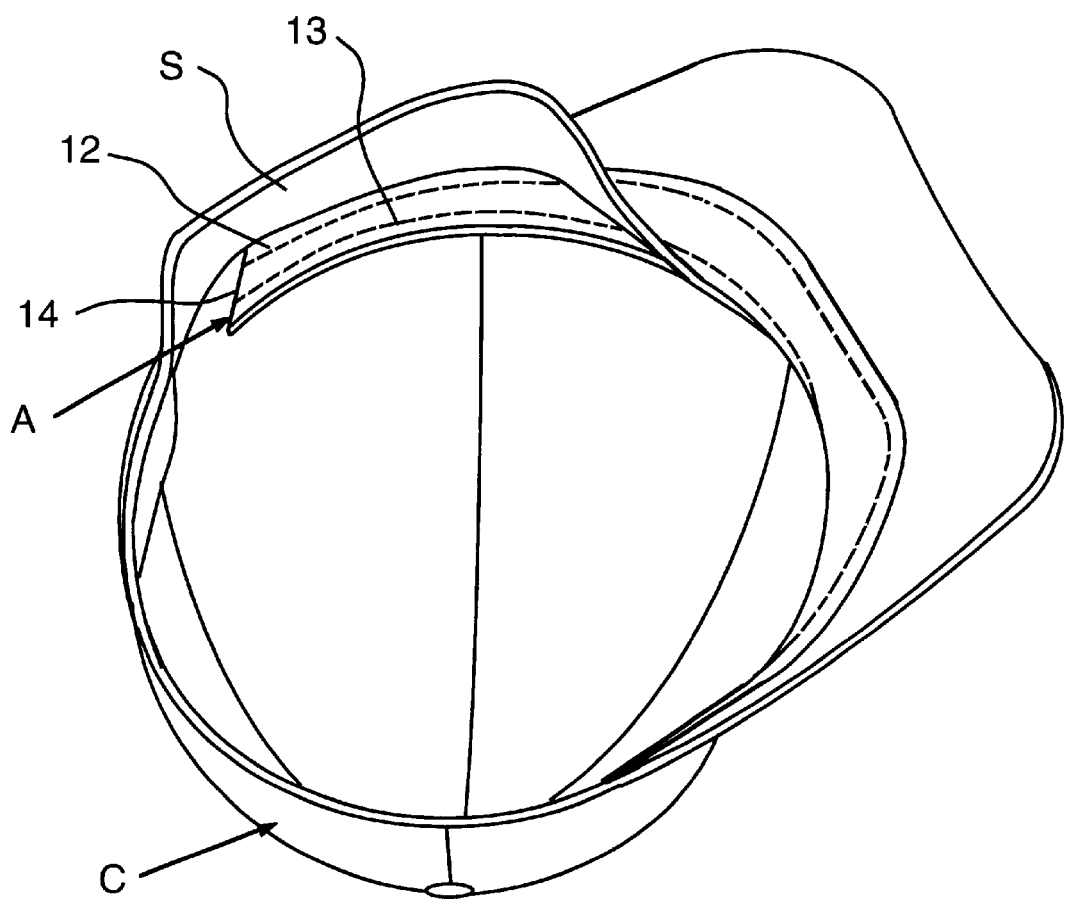
FIG. 1 is a perspective view, showing a cap provided with a conventional sweatband, with the cap being turned upside down.
Figure 2:
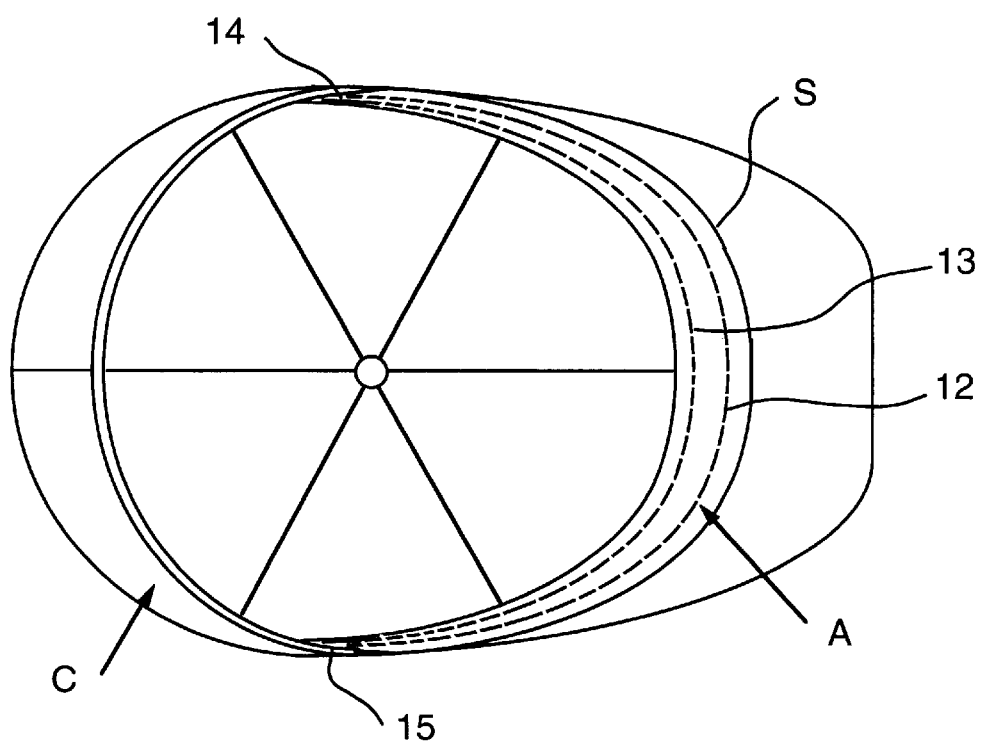
FIG. 2 is a bottom view, showing a cap provided with an auxiliary sweatband according to the preferred embodiment of this invention.
Figure 3:
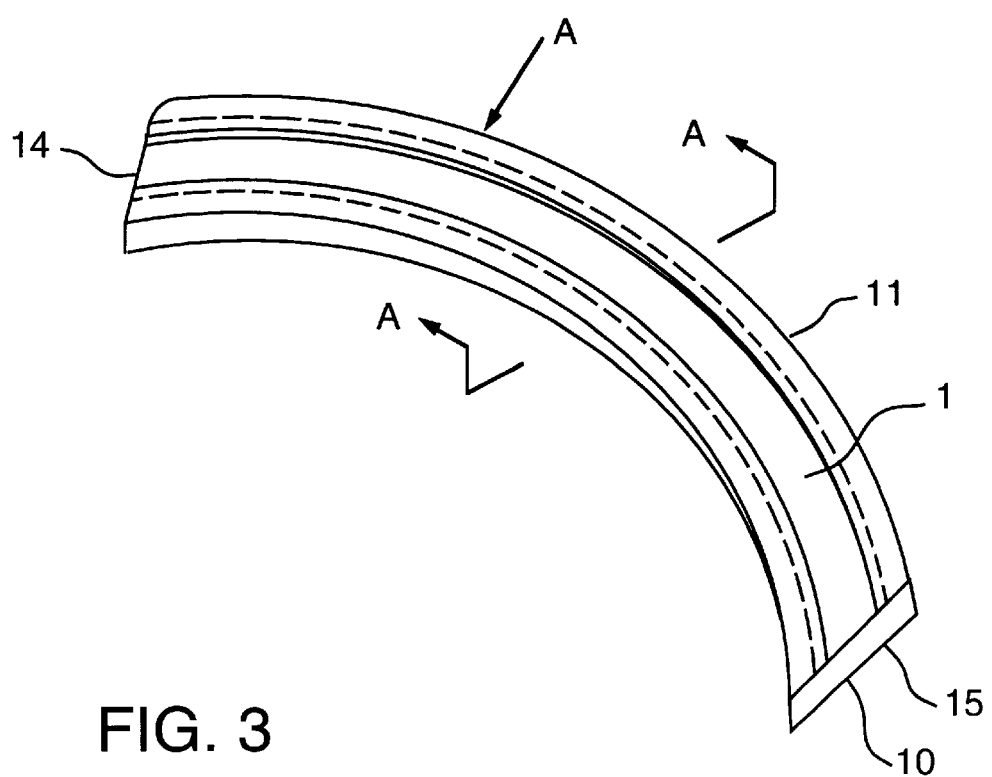
FIG. 3 is a perspective view, showing the auxiliary sweatband of the embodiment.
Figure 4:
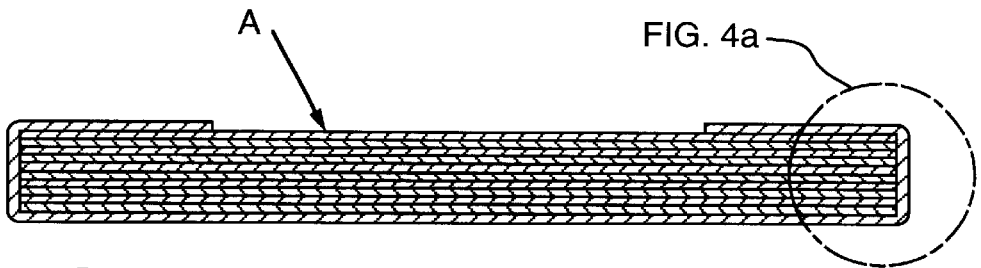
FIG. 4 is a sectional view, taken along a line A—A.
Figure 4A:
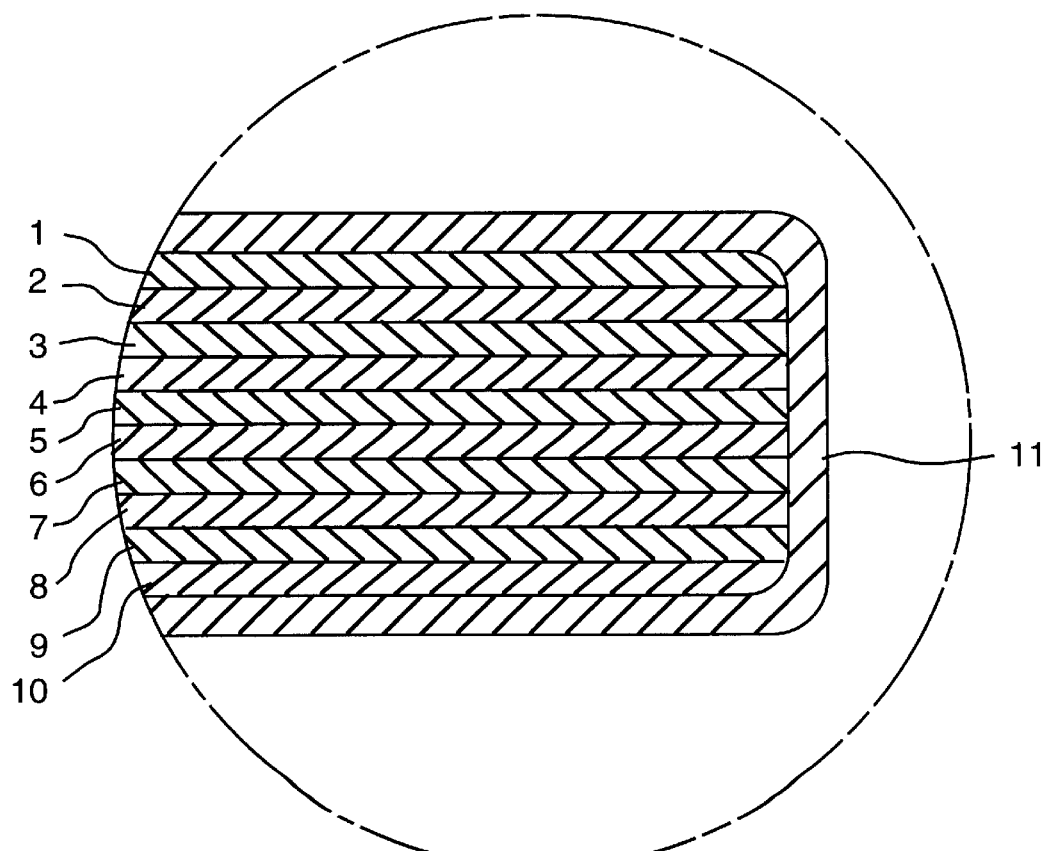
Figure 5:
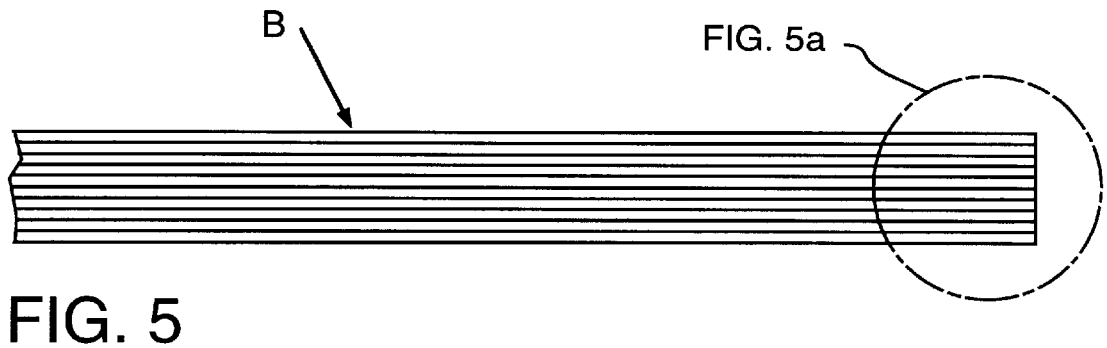
FIG. 5 is a vertical sectional view, showing a conventional multilayer sweatband.
Figure 5A:
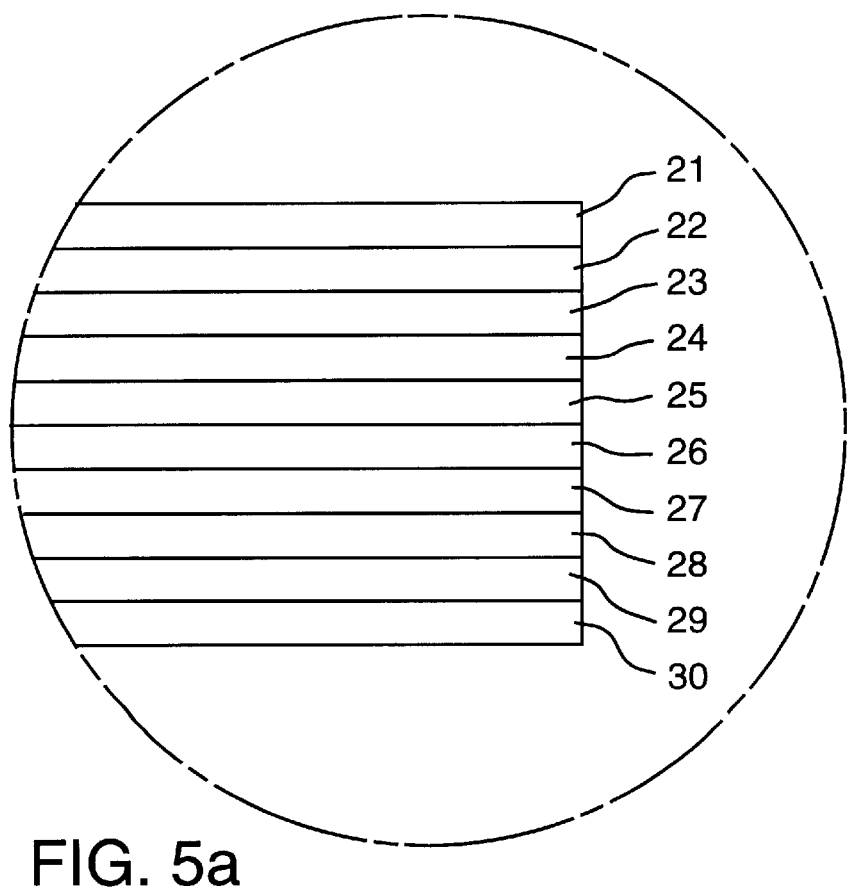

An auxiliary sweatband of this embodiment is described in the following in a right-side up position.

An auxiliary sweatband of this embodiment comprises eight normal non-woven fabric strips 1–8. A non-woven fabric strip 9 coated with a hydrophobic resin is laminated at the back of the eight normal non-woven fabric strips 1–8. The hydrophobic resin may be a vinyl chloride resin, a polyethylene resin, a polyprophylene resin, a polyester resin, etc. An unabsorbent non-woven fabric strip 10 is laminated at the back of the non-woven fabric strip 9. The laminated strips 1–10 are bonded together by a high frequency heat sealing technique. A nylon woven fabric strip 11 coated with a polyurethane resin is sewn with sewing threads 12 and 13 on the laminated strips 1–10 to surround the bottom, front, rear and top upper and lower portions of the strips 1–10. The auxiliary sweatband A is cut to be a little longer than the length of the inner edge of the visor of the cap and to have diagonal surfaces of 45° at its ends 14 and 15.

The normal non-woven fabric strips 1–8 may be made of 100% nylon or nylon spun blend yarn, the nylon spun blend yarn preferably containing less than 35 wt. % cellulose fibers, the cellulose fibers having a fine absorbent capability such as cotton fibers. Such a cellulose fiber may be a viscose rayon fiber, a paper pulp, a linen fiber, etc. When the nylon content of the fabric is less than 35 wt. %, the fabric strips may not be bonded by the high frequency heat sealing technique.

Incidentally, it is well known that a plurality of pores are formed between the fibers or the pulps and the pores absorb the sweat by a capillary action.

Pursuant to the inventor's experiments, when eight fiber strips 0.12 mm in width are laminated together, sufficient sweat-absorbent function is accomplished.

The reason why the non-woven fiber strip 9 coated with a hydrophobic resin is laminated on the eight normal fiber strips 1–8 coated with a hydrophobic resin is that the hydrophobic resin has functions of discharging water and being waterproof, thus delaying the duration of time for which the sweat passing through the eight normal non-woven fabric strips 1–8 reaches the nylon woven fabric strip 11 and discharging the sweat through both ends 14 and 15 of the auxiliary sweatband A for the duration of time.

As described above, the unabsorbent non-woven fabric strip 10 is interposed between the non-woven fiber strip 9 coated with a hydrophobic resin and the nylon woven fabric strip 11 coated with a polyurethane resin. The unabsorbent non-woven fabric strip 10 prevents the sweat from soaking into the crown of the cap, the sweat being absorbed through the sewing thread 12 and 13 and passing through the non-woven fiber strip 9. The sweat passing through the unabsorbent non-woven fabric strip 10 is obstructed by the nylon woven fabric strip 11.

The nylon woven fabric strip 11 coated with a polyurethane resin is employed to make use of the waterproof property, the light weight property and the corrosion-resistant property of the nylon and the waterproof property and the elasticity of the polyurethane resin. When wearing the cap, the user feels comfortable due to the elasticity of the polyurethane resin coating.

The sewing threads 12 and 13 used in the embodiment may not change in quality and become weak in spite of the permeation of the sweat.

The reason why the length of the auxiliary sweatband A is a little longer than the length of the inner edge of the visor is that the length is sufficient to cover the forehead and to discharge the sweat.

Further, the reason why the ends of the auxiliary sweatband A are cut to have diagonal surfaces of 45° at its ends 14 is to maximize the sweat-discharging area and to prevent the auxiliary sweatband A from being protruded.

Additionally, the reason why the waterproof sewing threads 12 and 13 are employed in this invention is to prevent the permeation of the sweat through the threads 12 and 13.

From the above description, it will be understood that this invention provides an auxiliary sweatband, absorbent the sweat passing through a main sweatband S and discharging the sweat through its both ends by a plurality of the normal non-woven fabric strips.

This invention also provides a auxiliary sweatband for headgear, preventing the permeation of the sweat by the non-woven fiber strip 9, the unabsorbent non-woven fabric strip 10 and the nylon woven fabric strip 11.

As a result, the auxiliary sweatband of this invention absorbs the sweat and discharges it, thus causing the wearer to feel comfortable and preventing the sweat from contaminating the crown of a cap.

Since a nylon woven fabric strip is coated with a polyurethane resin, the auxiliary sweatband of this invention may have elasticity.

Additionally, the auxiliary sweatband of this invention may be a support to maintain the shape of the cap.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An auxiliary sweatband for headgear, comprising:
   a plurality of laminated normal non-woven fabric strips;
   a non-woven fabric strip coated with a hydrophobic resin and laminated at a back of the normal non-woven fabric strips;
   an unabsorbent non-woven fabric strip laminated at a back of the non-woven fabric strip coated with a hydrophobic resin; and
   a nylon woven fabric strip coated with a polyurethane resin and sewn with sewing threads on the laminated strips to surround the laminated strips except a front middle portion of the laminated strips; and
   wherein the laminated non-woven strips are bonded together and the overlapped strips are cut to be a little longer than a length of an inner edge of a visor of a cap and to have diagonal surfaces of 45° at their ends.

* * * * *